Jan. 22, 1963 D. L. SPENCER 3,074,377
STOCK FEEDER
Filed May 23, 1961
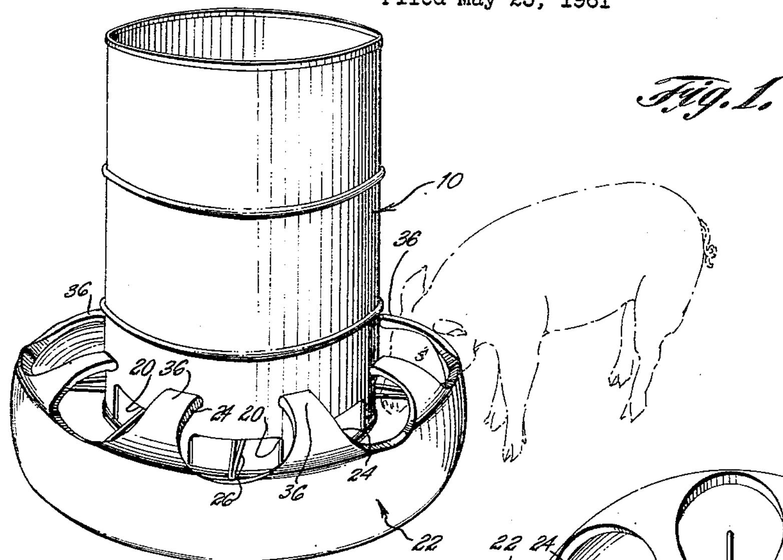
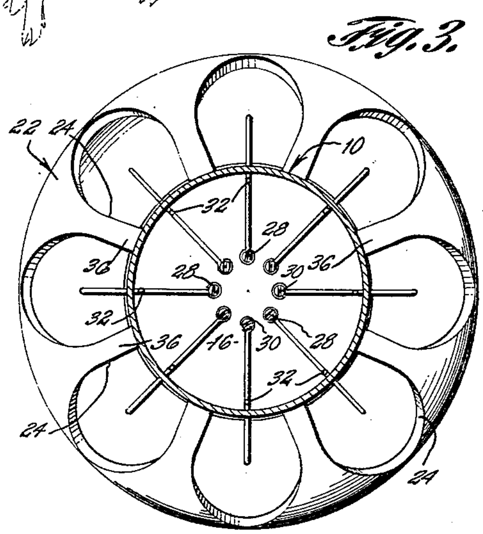
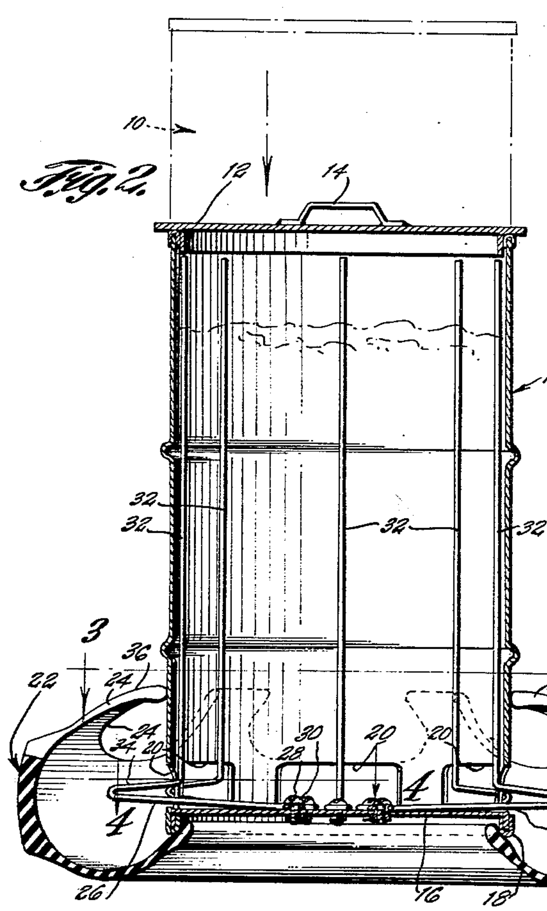
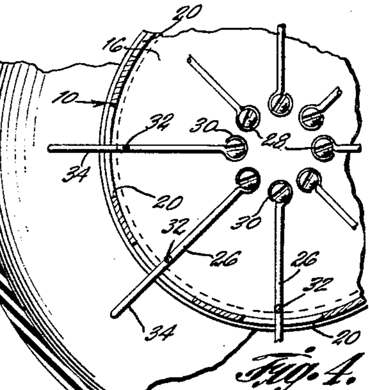
INVENTOR.
Donald L. Spencer
BY
McMorrow, Berman & Davidson
ATTORNEYS United States Patent Office 3,074,377
Patented Jan. 22, 1963

3,074,377

STOCK FEEDER

Donald L. Spencer, R.F.D. 4, Iowa City, Iowa

Filed May 23, 1961, Ser. No. 112,099
3 Claims. (Cl. 119—54)

This invention relates to a feeding system for stock animals, and particularly feed troughs with a central supply unit.

It is an object of the invention to provide a feeder with ready access to a central supply, yet affording economy of space and material. A further object is to provide a segregated feeding arrangement in which small stock may feed without undue waste, and which nevertheless is sufficiently flexible to accommodate larger animals. Yet another object is to combine, with the foregoing, an automatic feature for replenishing the feed in the trough. Additionally, it is an object to provide for a feeding device which is simple of construction, easy of manufacture, and low in cost.

These and other objects, which will be apparent to those skilled in the art, are attained by the present invention a preferred form of which is described in the following specification, as illustrated in the drawing, in which:

FIGURE 1 is a perspective view of the feeding system, with a feeding animal indicated in phantom, FIGURE 2 is an axial, sectional view through the system, FIGURE 3 is a sectional view taken on the line 3—3 of FIGURE 2, and FIGURE 4 is a sectional view along the line 4—4 of FIGURE 2, showing details.

Referring to the drawings by characters of reference, there is shown a small, silo type supply container 10, of cylindrical form, such as, for instance, a conventional steel barrel, which is provided with a protective cover 12, having a central handle 14.

The barrel has a bottom 16, with a peripheral bead 18, which is crimped over the lower edge of the side wall of the barrel, and from a line flush with the bottom of the barrel, its side wall is provided with a series of windows 20, equiangularly spaced about the periphery of the barrel and extending substantially above the bottom. These are the dispensing openings leading to the feed trough. Comporting with the cylindrical form of the barrel silo, the feed trough 22 is circular, or, more exactly, toroidal. As will be apparent from the drawing, the trough may consist of an old tire carcass, but the invention also contemplates its deliberate manufacture, as from plastic material, for instance. For feeder openings, recesses 24 are cut out of the bead and side wall of the tire, at angularly spaced positions about the tire. Preferably these will have the horseshoe shape indicated, and will be equal in number and spacing to the barrel windows 20, so that they may be aligned to permit agitation of the feed from the silo by the natural motions of the feeding animal. To this end, there is provided, at each window, a protruding rod 26, radially extending from a position centrally of the barrel bottom, to which it is secured by a screw 28, passing through an end loop 30 on the rod. The rod, which is preferably of springy material, extends into the interior of the feed trough, so that it will be actuated by the movements of the animal during feeding, and this agitation is not only communicated to the contents at the bottom of the barrel, but throughout its height, by virtue of a vertical portion 32 of the rod, rising from a reversely bent portion 34 of the rod which leads back through window 20.

The feed trough 22 has an inner diameter smaller than the diameter of the barrel, such that the bead 18 of the barrel bottom rests on the inner wall of the tire, and the tongues 36 of the tire wall between the recess 24 are fixed outwardly in being fitted over the barrel, so that they engage it with a degree of pressure due to the resiliency of the tire wall. This will vary with the tire and the width of the tongue, but in any case will be of appreciable magnitude. This not only tends to make the parts hang together, as when a shift of location is effected, but also tends to inhibit violent feeding action by the animals, yet yielding to steady pressures during normal behavior. While the windows in the trough may be designed for ready use only by the smaller animals, yet the construction is such that access can be negotiated by larger animals if need be, since they will readily learn to nose the impeding tongues out of the way. Nevertheless, the advantage lies with the smaller animals. During feeding, there will be a constantly repeated impact on rod 26 which will cause periodic disturbance within the supply barrel, and thus guarantee outflow of feed.

While a certain preferred embodiment has been shown and described, various modifications will be apparent to those skilled in the art, in the light of this disclosure, and the invention should not, therefore, be deemed as limited, except insofar as shall appear from the spirit and scope of the appended claims.

I claim:

1. A feeding device for stock, comprising a cylindrical supply container with closed bottom and a side wall having a series of equi-angularly spaced windows adjacent said bottom, a radially disposed spring rod passing through each of said windows and anchored to said bottom, centrally thereof, each said rod having a reversely bent portion passing through its respective window from the outside to the inside of the container, and a bent portion extending vertically upward through said container, and a circular trough frictionally attached to said container, comprising a hollow torus of horseshoe form cross section with an opening on its inner side, the diameter of said inner side being less than that of the container, and said trough having a series of notches on one side, opening into said inner side, equal in number and angular spacing to said windows.

2. The device of claim 1, said notches having a width substantially co-extensive with that of said windows.

3. A feeding device for stock, comprising a cylindrical supply container, with closed bottom, and a side wall having a series of equi-angularly spaced windows adjacent said bottom, a series of radially disposed spring rods anchored to said bottom and extending upwardly through said container, and having an arm extending through one of said windows, and a circular trough associated with said container, comprising a hollow torus of U-form cross section with the bight of the U outward, the diameter of inner edges of the torus being less than that of said container, whereby to form a support for the bottom thereof, and said torus having angularly spaced, radial notches in one wall and its inner edge, said notches equal in number and spacing to said windows, and the portions of said wall between the notches being adapted to be flexed and resiliently and frictionally engaging the side of said container.

References Cited in the file of this patent

UNITED STATES PATENTS

| | | |
|---|---|---|
| 1,156,428 | Myers | Oct. 12, 1915 |
| 1,788,092 | Fink | Jan. 6, 1931 |
| 2,592,638 | Andrew | Apr. 15, 1952 |
| 2,640,464 | Jindrick | June 2, 1953 |